(12) United States Patent
Ouderkirk et al.

(10) Patent No.: US 10,690,921 B1
(45) Date of Patent: Jun. 23, 2020

(54) APPARATUSES, SYSTEMS, AND METHODS FOR COORDINATED LENS ADJUSTMENTS

(71) Applicant: FACEBOOK TECHNOLOGIES, LLC, Menlo Park, CA (US)

(72) Inventors: Andrew J. Ouderkirk, Redmond, WA (US); Katherine Marie Smyth, Seattle, WA (US); Lu Lu, Kirkland, WA (US); John Cooke, Bothell, WA (US); Robin Sharma, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/935,441

(22) Filed: Mar. 26, 2018

(51) Int. Cl.
*G02B 3/12* (2006.01)
*G02B 27/01* (2006.01)
*G02B 3/14* (2006.01)

(52) U.S. Cl.
CPC ........... *G02B 27/0172* (2013.01); *G02B 3/14* (2013.01); *G02B 27/0176* (2013.01); *G02B 2027/0127* (2013.01); *G02B 2027/0154* (2013.01); *G02B 2027/0178* (2013.01)

(58) Field of Classification Search
CPC .. G02B 27/0172; G02B 27/0176; G02B 3/12; G02B 3/14; G02B 2027/0178
USPC .................................................. 359/665–667
See application file for complete search history.

(56) References Cited

U.S. PATENT DOCUMENTS

| | | | | |
|---|---|---|---|---|
| 6,081,388 | A * | 6/2000 | Widl | G02B 3/0081 |
| | | | | 359/665 |
| 2007/0211349 | A1* | 9/2007 | Chen | G02B 3/14 |
| | | | | 359/666 |
| 2016/0103253 | A1* | 4/2016 | Oku | G02B 3/14 |
| | | | | 359/666 |
| 2018/0275394 | A1* | 9/2018 | Yeoh | G02B 3/14 |

* cited by examiner

*Primary Examiner* — Darryl J Collins
(74) *Attorney, Agent, or Firm* — FisherBroyles, LLP

(57) ABSTRACT

An apparatus may include a proximal adjustable-focus lens. The apparatus may further include a distal adjustable-focus lens. The apparatus may additionally include an actuator coupled to both the proximal adjustable-focus lens and the distal adjustable-focus lens, such that mechanical action by the actuator simultaneously adjusts the proximal adjustable-focus lens and the distal adjustable-focus lens. Various other apparatuses, systems, and methods are also disclosed.

19 Claims, 16 Drawing Sheets

APPARATUSES, SYSTEMS, AND METHODS FOR COORDINATED LENS ADJUSTMENTS

BACKGROUND

Augmented reality systems that overlay virtual content onto the real world are becoming increasingly popular. A user looking through their phone's camera might see a monster, a baseball player, or a movie character overlaid onto the background of real-world objects and geographic features in the camera's range. Augmented reality system may also be used for purposes other than recreation—travelers may use them for navigation, governments may use them for military training simulations, doctors may use them to practice surgery, and engineers may use them as visualization aids.

In any use of an augmented reality system, making the experience as seamless as possible may be critical. Regrettably, a variety of factors may disrupt augmented-reality immersion, and one of the most significant disruptions to having an immersive experience may be a phenomenon known as "vergence-accommodation conflict." Traditional augmented-reality displays may attempt to create the illusion that a virtual object is set at a distance in the real-world environment by displaying virtual images to the left eye and to the right eye with a relative offset, such that a user's eyes converge on the desired real-world focal point to align the left- and right-side virtual images. At the same time, the user's left and right eyes also undergo accommodation to bring the respective left- and right-side virtual images into focus. However, the distance of the real-world focal point may frequently differ from the distance of the augmented-reality display, causing a difference between the apparent vergence distance and the apparent accommodation distance of a virtual object. Unfortunately, because the human visual system is adapted to the expectation that the apparent vergence distance and the apparent accommodation distance of a real-world object will match, the mismatch frequently posed by traditional augmented reality systems may confuse a user's vision, potentially breaking a sense of immersion—or even causing severe physical discomfort.

SUMMARY

As will be described in greater detail below, the instant disclosure describes an adjustable lens assembly with two adjustable-focus lenses being simultaneously adjustable by a single actuator (thereby, e.g., both modifying the apparent accommodation distance of a virtual object shown in a virtual display between the adjustable-focus lenses while minimizing any distortion of the appearance of real-world objects beyond the lens assembly).

In one example, an apparatus may include a proximal adjustable-focus lens, a distal adjustable-focus lens, and an actuator coupled to both the proximal adjustable-focus lens and the distal adjustable-focus lens. Mechanical action by the actuator may simultaneously adjust the proximal adjustable-focus lens and the distal adjustable-focus lens.

In some examples, the apparatus may also include a carriage element that is coupled to both the proximal adjustable-focus lens and the distal adjustable-focus lens. In these examples, the mechanical action by the actuator may drive the carriage element. Furthermore, in some examples, the proximal adjustable-focus lens may include a proximal liquid lens and the distal adjustable-focus lens may include a distal liquid lens.

According to some embodiments, the proximal liquid lens may include a first force distributor coupled to a membrane of the proximal liquid lens. The first force distributor may distribute force applied to a surface area of the first force distributor via the carriage element to a surface area of the membrane of the proximal liquid lens, thereby modifying the shape of the proximal liquid lens. Likewise, the distal liquid lens may include a second force distributor coupled to a membrane of the distal liquid lens. The second force distributor may distribute force applied to a surface area of the second force distributor via the carriage element to the surface area of the membrane of the distal liquid lens, thereby modifying the shape of the distal liquid lens.

Movement of the carriage element may result in changes to forces to the distal and proximal lenses. In some examples, movement of the carriage element toward the proximal liquid lens may move the carriage element away from the distal liquid lens, thereby causing (i) a change in force applied to the proximal liquid lens representing a change in a direction toward the proximal liquid lens and (ii) a change in force applied to the distal liquid lens representing a change in a direction away from the distal liquid lens. Likewise, movement of the carriage element toward the distal liquid lens may move the carriage element away from the distal liquid lens, thereby causing (i) a change in force applied to the distal liquid lens representing a change in a direction toward the distal liquid lens and (ii) a change in force applied to the proximal liquid lens representing a change in a direction away from the proximal liquid lens.

In some examples, movement of the carriage element toward the proximal liquid lens may move the carriage element away from the distal liquid lens, resulting in an increase in a pushing force applied via the carriage element onto the proximal liquid lens and a decrease in a pushing force applied via the carriage element onto the distal liquid lens. Likewise, movement of the carriage element toward the distal liquid lens may move the carriage element away from the proximal liquid lens, resulting in an increase in a pushing force applied via the carriage element onto the distal liquid lens and a decrease in a pushing force applied via the carriage element onto the proximal liquid lens.

In addition, in some examples movement of the carriage element toward the proximal liquid lens may move the carriage element away from the distal liquid lens, resulting in (i) a decrease in a pulling force applied via the carriage element on the proximal liquid lens and a decrease in a pushing force applied via the carriage element toward the distal liquid lens when the carriage element is at greater than a threshold distance from the proximal liquid lens, and (ii) an increase in a pushing force applied via the carriage element onto the proximal liquid lens and an increase in a pulling force applied via the carriage element on the distal liquid lens when the carriage element is at less than the threshold distance from the proximal liquid lens. Likewise, movement of the carriage element toward the distal liquid lens may move the carriage element away from the proximal liquid lens, resulting in (i) a decrease in a pulling force applied via the carriage element on the distal liquid lens and a decrease in a pushing force applied via the carriage element toward the proximal liquid lens when the carriage element is at less than the threshold distance from the proximal liquid lens, and (ii) an increase in a pushing force applied via the carriage element onto the distal liquid lens and an increasing in a pulling force applied via the carriage element on the proximal liquid lens when the carriage element is at greater than the threshold distance from the proximal liquid lens.

According to various embodiments, a combination of the proximal adjustable-focus lens and the distal adjustable-focus lens may maintain a substantially constant optical power as the proximal adjustable-focus lens and the distal adjustable-focus lens. In some examples, a combination of the proximal adjustable-focus lens and the distal adjustable-focus lens may maintain substantially no optical power as the proximal adjustable-focus lens and the distal adjustable-focus lens adjust.

In some examples, as the proximal adjustable-focus lens adjusts to increase in optical power, the distal adjustable-focus lens may adjust to decrease in optical power. Likewise, as the proximal adjustable-focus lens adjusts to decrease in optical power, the distal adjustable-focus lens may adjust to increase in optical power. In these examples, the apparatus may further include a proximal negative lens that share an optical axis with the proximal adjustable-focus lens and the distal adjustable-focus lens and that is adjacent to the proximal adjustable-focus lens. In addition, in some examples, a combination of the proximal negative lens, the proximal adjustable-focus lens, and the distal adjustable-focus lens may maintain substantially no optical power as the proximal adjustable-focus lens and the distal adjustable-focus lens adjust. In some examples, the proximal adjustable-focus lens may adjust from a substantially flat shape to a convex shape as the distal adjustable-focus lens adjusts from a convex shape to a substantially flat shape. In certain examples, the proximal adjustable-focus lens may adjust from a concave shape to a substantially flat shape as the distal adjustable-focus lens adjusts from a substantially flat shape to a concave shape.

As discussed above, in some examples the proximal adjustable-focus lens may increase in optical power as the distal adjustable-focus lens decreases in optical power (and vice versa). In these examples, the apparatus may further include a proximal negative lens that shares an optical axis with the proximal adjustable-focus lens and the distal adjustable-focus lens and that is adjacent to the proximal adjustable-focus lens. In addition, the apparatus may include a distal positive lens that shares the optical axis and that is adjacent to the distal adjustable-focus lens. Furthermore, in some examples, a combination of the proximal negative lens, the proximal adjustable-focus lens, the distal adjustable-focus lens, and the distal positive lens may maintain substantially no optical power as the proximal adjustable-focus lens and the distal adjustable-focus lens adjust.

In some embodiments, the apparatus may further include a see-through display situated between the proximal adjustable-focus lens and the distal adjustable-focus lens, such that, when the proximal adjustable-focus lens is held up to a user's face, the user views the see-through display through the proximal adjustable-focus lens and views past the see-through display through the proximal adjustable-focus lens and the distal adjustable-focus lens. Accordingly, adjusting the proximal adjustable-focus lens may alter an apparent accommodation distance of a virtual image displayed on the see-through display. In addition, the distal adjustable-focus lens may adjust as the proximal adjustable-focus lens adjusts such that an appearance of a real-world image viewable past the see-through display is not substantially altered when the proximal adjustable-focus lens adjusts.

A corresponding system may include a head-mounted display that includes a pair of lens-display assemblies. Each of the pair of lens-display assemblies may include: (i) a proximal adjustable-focus lens and a distal adjustable-focus lens arranged in tandem along an optical axis, (ii) an actuator coupled to both the proximal adjustable-focus lens and the distal adjustable-focus lens, such that mechanical action by the actuator simultaneously adjusts the proximal adjustable-focus lens and the distal adjustable-focus lens, and (iii) a see-through display situated between the proximal adjustable-focus lens and the distal adjustable-focus lens, such that, when the lens-display assembly is held up to a user's face, the user views the see-through display through the proximal adjustable-focus lens and views past the see-through display through the proximal adjustable-focus lens and the distal adjustable-focus lens. In some examples, adjusting the proximal adjustable-focus lens may alter an apparent accommodation distance of a virtual image displayed on the see-through display. In addition, the distal adjustable-focus lens may adjust as the proximal adjustable-focus lens adjusts such that an appearance of a real-world image viewable past the see-through display is not substantially altered when the proximal adjustable-focus lens adjusts.

In some examples, an augmented reality system may display the virtual image in the respective see-through displays of each of the pair of lens-display assemblies such that the virtual image appears to be situated in the user's environment according to an apparent focal point determined by a positioning of the virtual image in the respective see-through displays of each of the pair of lens-display assemblies.

In some embodiments, the system may further include a control element that receives virtual positioning information from the augmented reality system that indicates a virtual distance of the virtual image from the user, wherein the control element, based at least in part on the virtual positioning information, directs the positioning of the virtual image in the respective see-through displays of each of the pair of lens-display assemblies. In addition, in some examples, the control element may adjust, for each lens-display assembly in the pair of lens-display assemblies, the proximal adjustable-focus lens such that an apparent accommodation distance of the virtual image substantially matches an apparent vergence distance of the virtual image.

In addition to the various systems and devices described herein, the instant disclosure presents, by way of example, methods associated with adjustable lens assemblies. For example, a method may include coupling a carriage element to a proximal adjustable-focus lens and a distal adjustable-focus lens, such that movement of the carriage element simultaneously adjusts the proximal adjustable-focus lens and the distal adjustable-focus lens. The method may also include coupling an actuator to the carriage element such that mechanical action by the actuator drives the carriage element.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
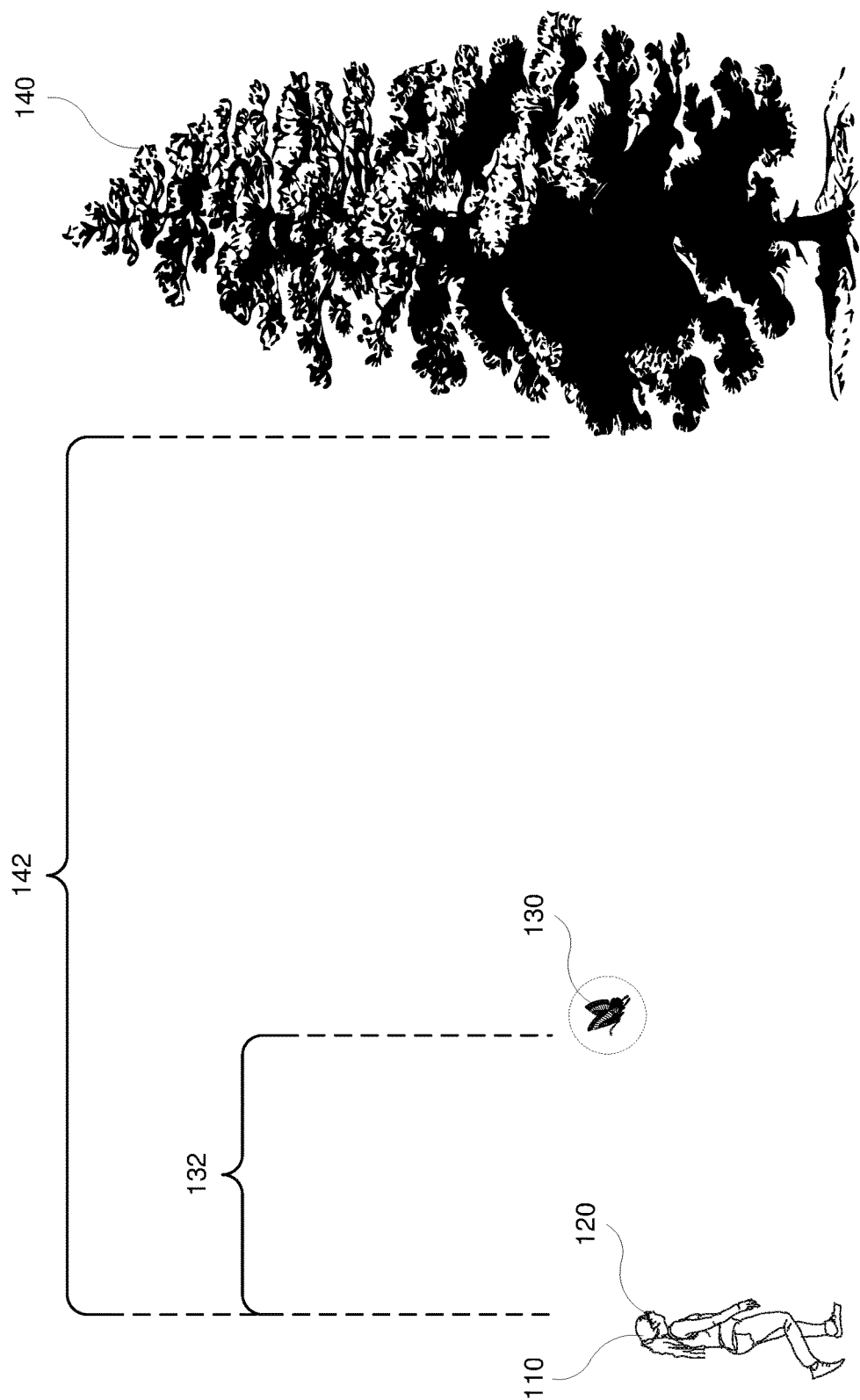
FIG. 1 is an illustration of a user viewing a virtual object within a real-world environment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses and systems for coordinating lens adjustments. As will be explained in greater detail below, an adjustment mechanism for a pair of adjustable lenses may use a single actuator to simultaneously adjust each of the adjustable lenses. For example, a carriage element may move between the pair of adjustable lenses, reducing or increasing deforming forces applied to the adjustable lenses.

In some examples, by simultaneously adjusting the lenses, the adjustment mechanism may modify the optical power provided for images originating between the pair of adjustable lenses without modifying the optical power provided for images originating beyond the pair of adjustable lenses in the same way. For example, the adjustment mechanism may modify the optical power provided for an image originating between the pair of adjustable lenses (e.g., from an augmented reality display) without modifying the optical power provided for an image originating beyond the pair of adjustable lenses (e.g., from a real-world object). In some examples, this may allow apparatuses and systems described herein to reduce, minimize, or eliminate accommodation-vergence conflict caused by augmented reality displays by modifying the apparent accommodation distance of images while minimizing any distortion to real-world images. Furthermore, in some examples, by using a single actuator to drive a carriage element connecting the lenses, these apparatus and systems may reduce the amount of actuating force applied to deform the lenses. In addition, the use of a single adjustment mechanism may reduce the form factor, the cost of manufacture, and/or the potential points of failure of an adjustable lens assembly. As discussed in greater detail below, the various embodiments disclosed herein, whether used alone or in combination, may help optimize the immersiveness, enjoyability, and/or utility of an augmented-reality experience.

The following will provide, with reference to FIG. 1, an example augmented-reality experience. In addition, the discussion associated with FIGS. 2-4 will provide examples of adjustable lenses. Furthermore, the discussion associated with FIGS. 5-11 and 13 will provide examples of lens assemblies and lens-display assemblies that include the adjustable lenses illustrated in FIGS. 2-4. Additionally, the discussion associated with FIG. 12 will provide examples of force/displacement relationships. The discussion associated with FIG. 14 will provide examples of head-mounted displays. In addition, the discussion associated with FIG. 15 will provide examples of augmented-reality systems. Finally, the discussion associated with FIG. 16 will provide examples of methods for manufacturing, assembling, configuring, and/or using the lens adjustment mechanisms presented herein.

FIG. 1 is an illustration of a user 110 viewing a virtual object 130 via an augmented-reality system 120. Generally, augmented-reality system 120 may display images to user 110 such that corresponding virtual objects appear to be located within the real-world environment. For example, although augmented-reality system 120 may display images representing virtual object 130 from a position directly in front of the face of user 110 (e.g., centimeters from her eyes), augmented-reality system 120 may position images for virtual object 130 such that a left-side and a right-side image of virtual object 130 align when user 110 converges her eyes at a point in the real-world environment at a distance 132 from user 110. Thus, virtual object 130 may appear to user 110 to be at distance 132 from user 110.

Because the apparent vergence distance of virtual object 130 may be at distance 132 (e.g., meters away from user 110) and because augmented-reality system 120 may display images much closer to the face of user 110 (e.g., centimeters away from user 110) to portray virtual object 130, augmented-reality system 120 may, absent any correction, cause user 110 to experience a vergence-accommodation conflict. As a consequence, user 110 may perceive virtual object 130 as less realistic or out of place. Additionally or alternatively, user 110 may experience discomfort associated with the vergence-accommodation conflict, such as nausea, headaches, or eye strain.

In some examples, as will be explained in greater detail below, a proximal lens set between user 110 and the augmented-reality display may alter the apparent accommodation distance of virtual object 130, thereby reducing and/or eliminating the vergence-accommodation conflict. Accordingly, an adjustable proximal lens may variably adjust the apparent accommodation distance, thereby reducing and/or eliminating the vergence-accommodation conflict of virtual objects at varying distances from user 110, and/or minimizing the vergence-accommodation conflict as virtual object 130 moves closer or further from user 110. However, the same distortion applied by the proximal adjustable lens that corrects the vergence-accommodation conflict for virtual object 130 may, absent correction, also alter the appearance of a real-world object 140 at a distance 142. Accordingly, as will be discussed in greater detail below, an adjustable distal lens set on the far side of the augmented-reality display may reduce and/or eliminate the distortion of real-world objects otherwise caused by adjustments of the adjustable proximal lens. Thus, the lens-adjustment mechanisms disclosed herein may enable user 110 to see virtual object 130 clearly, as a seamless part of the real-world environment, and unambiguously appearing to be at distance 132. In addition, these mechanisms may enable user 110 to use augmented-reality system 120 for extended periods without experiencing significant vergence-accommodation conflict and associated symptoms, such as nausea and headaches. Furthermore, these mechanisms may enable user 110 to continue to see real objects in the real-world environment, such as tree 140, clearly, without substantial distortion, and at expected distances (e.g., tree 140 may correctly appear to user 110 to be at distance 142).

Figure 2:
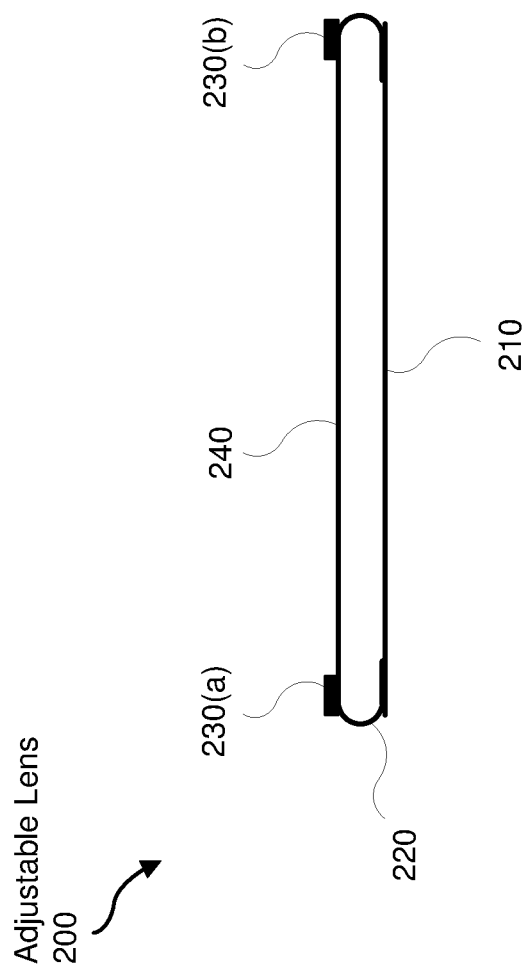
FIG. 2 is a side view of an adjustable lens.

FIG. 2 shows a side view of an adjustable lens 200. As shown in FIG. 2, adjustable lens 200 may include a substrate 210, edge seal 220, force distributors 230(*a*) and 230(*b*), and a membrane 240. Adjustable lens 200 may include any suitable type of lens with adjustable optical properties (e.g., adjustable optical power). In some examples, as will be explained in greater detail below, adjustable lens 200 may include a liquid lens. For example, adjustable lens 200 may be filled with an optical liquid (i.e., between substrate 210 and membrane 240). Additionally or alternatively, adjustable lens 200 may be filled with a semi-solid material (e.g., a gel, a semi-solid polymer, etc.). In various examples, adjustable lens 200 may contain a substantially transparent material that deforms and/or flows under pressure. Generally, adjustable lens 200 may contain any material suitable for an adjustable lens.

Substrate 210 may be composed of any suitable material. In some examples, substrate 210 may include a rigid material. For example, substrate 210 may be composed of a rigid, substantially transparent polymer. Membrane 240 may also include any suitable material. For example, membrane 240 may include a substantially transparent and elastic material. As will be explained in greater detail below, in some examples membrane 240 may be deformed using one or more force distributors (e.g., force distributors 230(*a*) and 230(*b*) to produce a desired optical power for adjustable lens 200. In some examples, edge seal 220 may be formed of a different material than that of membrane 240. In various examples, edge seal 220 and membrane 240 may be formed of the same material and/or may be continuous. For example, edge seal 220 and membrane 240 may be an integral element shaped to produce membrane 240 with edge seal 220.

In some examples, force distributors 230(*a*) and 230(*b*) may be in contact with membrane 240 and be arranged such that forces applied to force distributors 230(*a*) and/or 230(*b*) creates a force over an area of membrane 240. In some examples, when a force is applied to an area of force distributor 230(*a*) and/or 230(*b*), force distributor 230(*a*) and/or 230(*b*) may create a force over a larger area of membrane 240. Forces transmitted by force distributors 230(*a*) and/or 230(*b*) may deform adjustable lens 200 into a shape with desired optical properties. In some examples, force distributors 230(*a*) and 230(*b*) may represent parts of a single, integral force distributor. In some examples, force distributors 230(*a*) and 230(*b*) may represent two sections among a larger number of force distributors arranged on membrane 240. According to some examples, force distributors 230(*a*) and 230(*b*) may form parts of a force distribution ring (whether integral or in sections). In some examples, the force distribution ring may run near the perimeter of membrane 240. In addition to deforming adjustable lens 200, in some examples force distributors 230(*a*) and/or 230(*b*) may maintain tension within membrane 240.

Adjustable lens 200 may be any suitable shape. For example, adjustable lens 200 may be a circular lens or a non-circular lens. In some examples, adjustable lens 200 may be of a shape substantially similar to eyeglass lens shapes and/or suitable for fitting into a frame similar to eyeglass frames.

In some examples, FIG. 2 may show adjustable lens 200 in a neutral state. For example, as depicted in FIG. 2, adjustable lens 200 may have no substantial optical power. Additionally or alternatively, in some examples, as depicted in FIG. 2, no force may be applied to force distributors 230(*a*) and 230(*b*). In some examples, FIG. 2 may illustrate adjustable lens 200 with a threshold amount of force applied to membrane 240 (e.g., via force distributors 230(*a*) and 230(*b*) to maintain tension within membrane 240.

In some examples, as used herein, references to "substantial" optical power may refer to an amount of optical power that substantially alters the appearance of an image to a person viewing the image under the optical power. In these examples, references to a lack of substantial optical power (e.g., "substantially no optical power") may refer to an amount of optical power that does not substantially alter the appearance of an image to a person viewing the image under the optical power. In some examples, "substantial" optical power may refer to an amount of optical power that noticeably alters the appearance of an image to a person viewing the image under the optical power, and "substantially no optical power" may refer to an amount of optical power that does not noticeably alter the appearance of an image to a person viewing the image under the optical power. According to various examples, "substantial" optical power may refer to 0.1 or more diopters, 0.15 or more diopters, 0.2 or more diopters, 0.25 or more diopters, 0.3 or more diopters, 0.4 or more diopters, 0.5 or more diopters, or 0.6 or more diopters. Likewise, according to various examples, "substantially no optical power" may refer to less than 0.1 diopters, less than 0.15 diopters, less than 0.2 diopters, less than 0.25 diopters, less than 0.3 diopters, less than 0.4 diopters, less than 0.5 diopters, or less than 0.6 diopters.

In addition, in some examples, references to "substantially constant" optical power may indicate that any changes in optical power amount to substantially no optical power (according to one or more of the uses of "substantially no optical power" discussed above).

Figure 3:
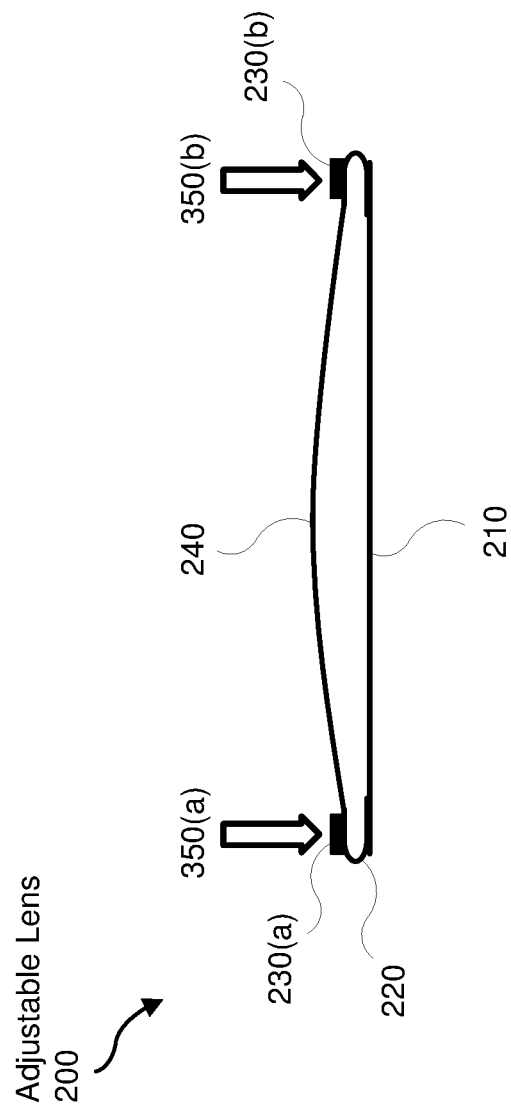
FIG. 3 is a side view of an adjustable lens in an adjusted state.
Figure 4:
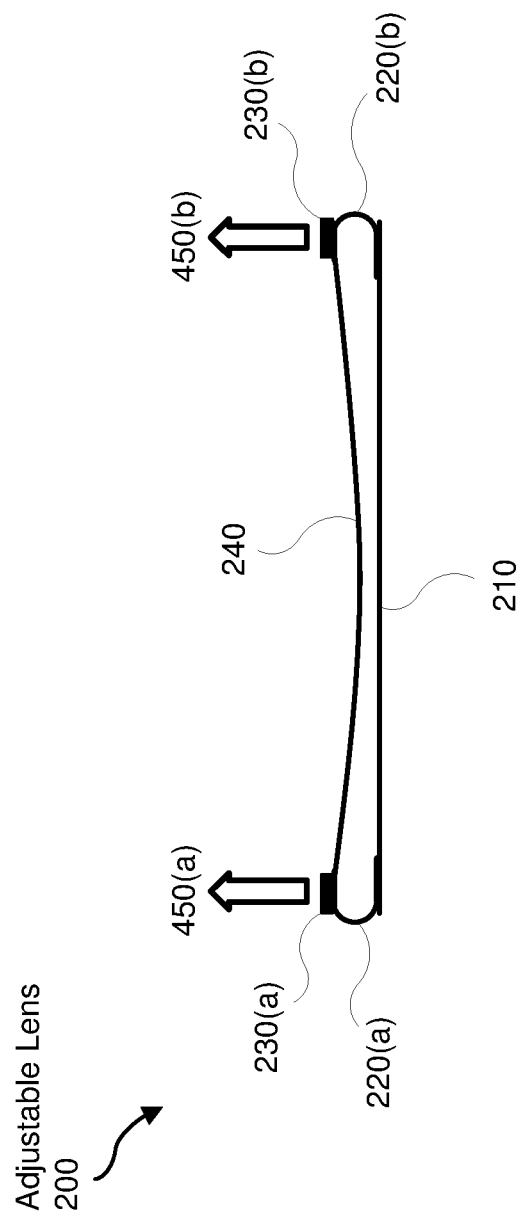
FIG. 4 is a side view of an adjustable lens in another adjusted state.

FIGS. 3 and 4 illustrate adjustable lens 200 in different states. For example, FIG. 3 shows a force 350(*a*) applied to force distributor 230(*a*) in the direction of adjustable lens 200 and a force 350(*b*) applied to force distributor 230(*b*) in the direction of adjustable lens 200. Force distributors 230(*a*) and 230(*b*) compress regions of membrane 240, causing the material within adjustable lens 200 (e.g., optical fluid) to move toward the center of adjustable lens 200. Adjustable lens 200 may thereby create optical power for light transmitted through adjustable lens 200. For example, adjustable lens 200 as shown in FIG. 3 may form a plano-convex lens and exhibit positive optical power.

FIG. 4 shows a force 450(*a*) applied to force distributor 230(*a*) away from adjustable lens 200 and a force 450(*b*) applied to force distributor 230(*b*) away from adjustable lens 200. Force distributors 230(*a*) and 230(*b*) may therefore move away from substrate 210. By moving away from substrate 210, force distributors 230(*a*) and 230(*b*) may reduce the pressure of the material within adjustable lens 200 (e.g., optical fluid). Adjustable lens 200 may thereby form a plano-concave lens and exhibit negative optical power.

Figure 5:
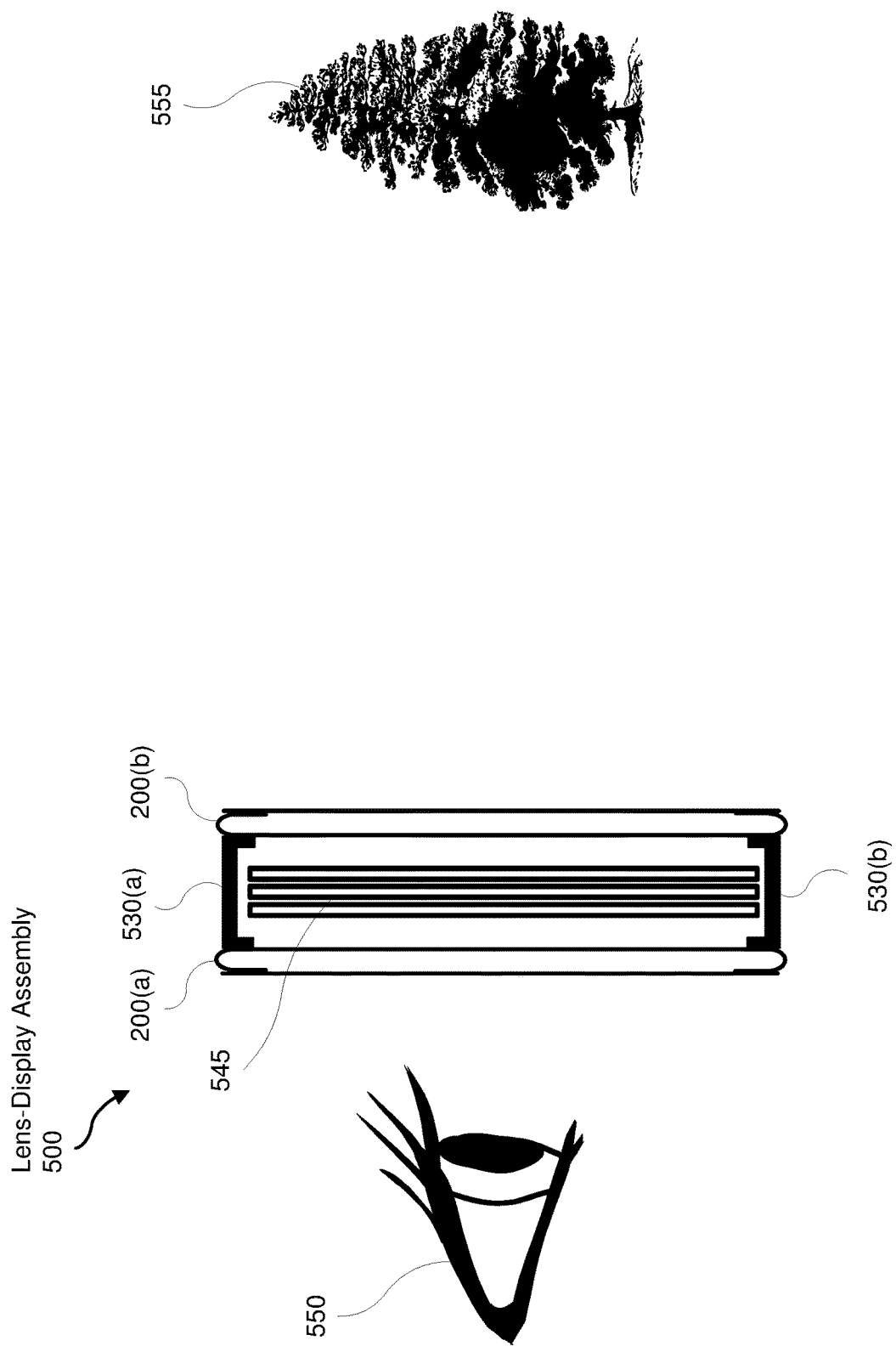
FIG. 5 is a side view of a lens-display assembly.

FIG. 5 shows a side view of a lens-display assembly 500. As shown in FIG. 5, lens-display assembly 500 may include an adjustable lens 200(a) and an adjustable lens 200(b) (e.g., two instances of adjustable lens 200 shown in FIG. 2). In addition, lens-display assembly 500 may include a carriage 530(a) and a carriage 530(b), each of which connect adjustable lens 200(a) to adjustable lens 200(b) (e.g., via their respective force distributors).

Because carriages 530(a) and 530(b) are connected to the force distributors of both adjustable lens 200(a) and 200(b), when carriage 530(a) and/or 530(b) moves, carriage 530(a) and/or 530(b) may apply forces to adjustable lenses 200(a) and 200(b) simultaneously, thereby deforming (and modifying the optical power of) adjustable lenses 200(a) and 200(b).

In addition, in some examples, lens-display assembly 500 may include a display 545 situated between adjustable lenses 200(a) and 200(b). For example, display 545 may include an augmented-reality display that is substantially translucent (except for, e.g., virtual objects displayed by display 545), allowing a user eye 550 to see beyond display 545 to real-world objects such as a tree 555.

As shown in FIG. 5, carriages 530(a) and 530(b) may each apply equal pressure to adjustable lenses 200(a) and 200(b) (e.g., pressure sufficient to maintain tension within the respective membranes of adjustable lenses 200(a) and 200(b) but not to deform adjustable lenses 200(a) and 200(b)). Accordingly, adjustable lenses 200(a) and 200(b) may be flat and exhibit no substantial optical power. Thus, the apparent accommodation distance of a virtual object displayed by display 545 may be the actual distance of display 545 from the user's eye 550. Likewise, lens-display assembly 500 may not significantly change the appearance of tree 555 to the user's eye 550.

In some examples, one or more of the carriages described herein may be rigid. Additionally or alternatively, one or more of the carriages described herein m ay have a degree of elasticity in one or more directions. In some examples, the length of the carriages may be fixed. In some examples, the length of the carriages may be adjustable. For example, the length of a carriage may be manually adjustable by using, e.g., a set screw or an adjustable threaded shaft. Additionally or alternatively, the length of the carriage may be dynamically adjustable through the use of, e.g., a piezoelectric stack.

As will be described in greater detail below, in some examples one or more of the carriage described herein may be driven by one or more actuators. For example, the actuator may include an electromechanical actuator. Examples of actuators that may drive the carriages described herein may include, without limitation, a piezoelectric, an electroactive polymer, an electrostrictive polymer, a shape memory alloy, a voice coil, a pneumatic actuator, an electromagnetic motor (e.g., a servo motor, a stepper motor, a DC motor, etc.), a hydraulic actuator, or a combination thereof.

Figure 6:
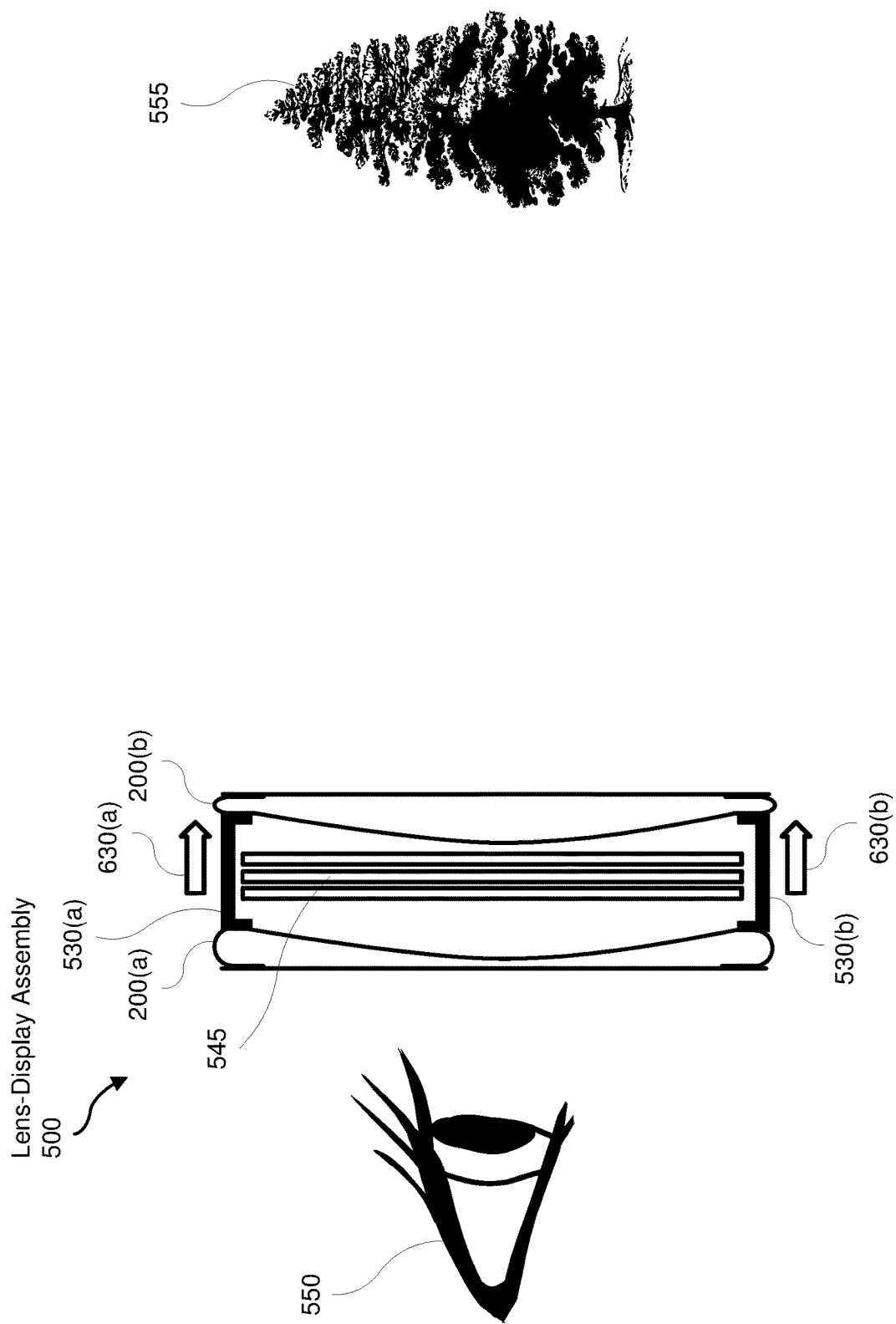
FIG. 6 is a side view of a lens-display assembly in an adjusted state.

FIG. 6 illustrates lens-display assembly 500 in an adjusted state. As shown in FIG. 6, carriages 530(a) and 530(b) may move away from the user's eye 550 and adjustable lens 200(a) and toward adjustable lens 200(b). In the process, forces 630(a) and 630(b) applied by carriages 530(a) and 530(b), respectively, may shape adjustable lens 200(a) into a plano-concave lens and adjustable lens 200(b) into a plano-convex lens. Adjustable lens 200(a) may thereby cause an image displayed by display 545 to appear closer to the user's eye 550. At the same time, adjustable lens 200(b) may compensate for the optical power created by adjustable lens 200(a) so that the appearance of tree 555 does not appear significantly affected by the change to adjustable lens 200(a).

As may be appreciated, although FIGS. 5 and 6 may show two distinct states of lens-display assembly 500, in some examples, intermediate positionings of carriages 530(a) and 530(b) may result in intermediate changes to the apparent accommodation distance of images displayed by display 545, allowing for a continuous range of possible apparent accommodation distances for virtual objects while maintaining the fidelity of the appearance of real-world objects.

Figure 7:
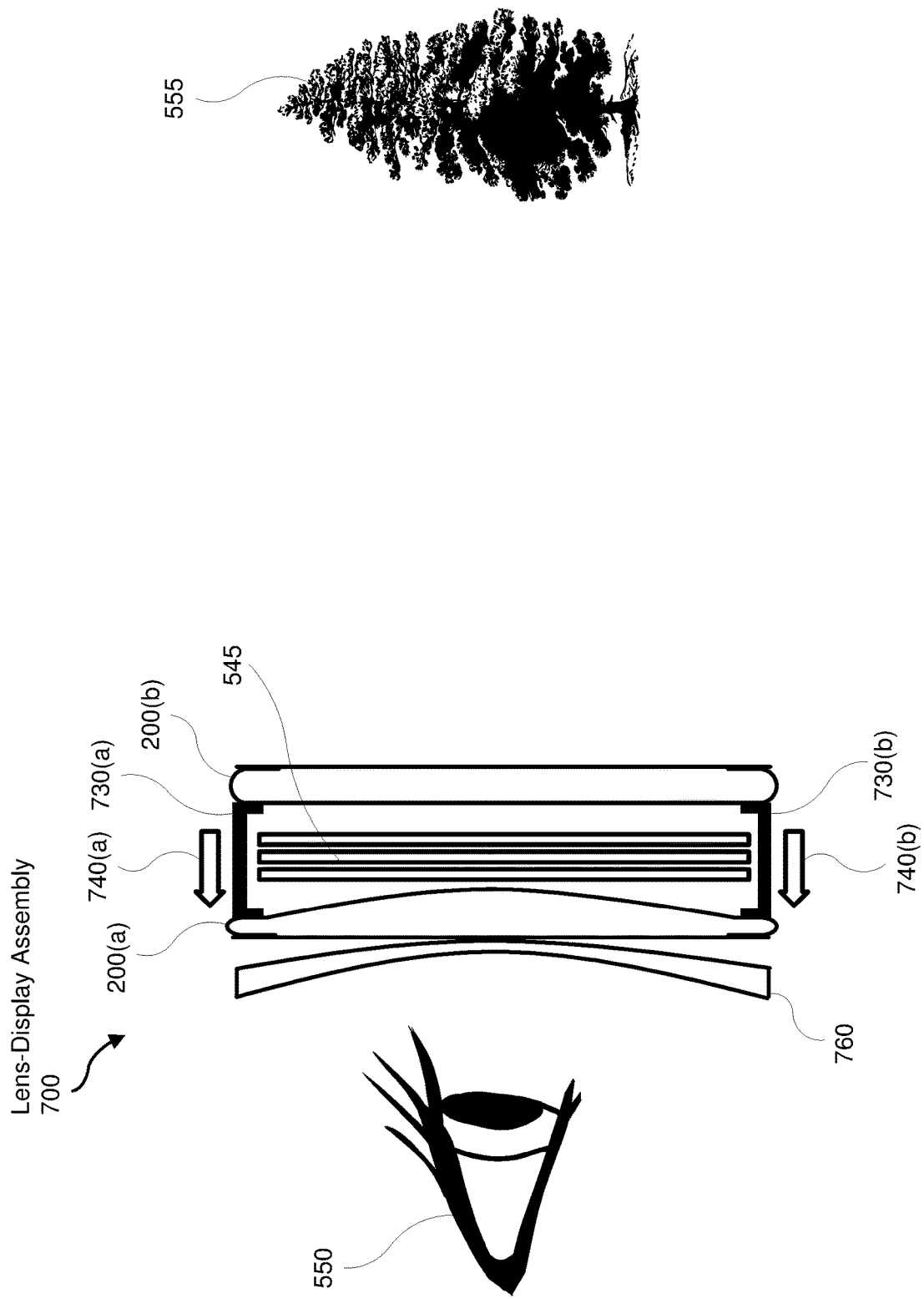
FIG. 7 is a side view of an additional lens-display assembly in an adjusted state.
Figure 8:
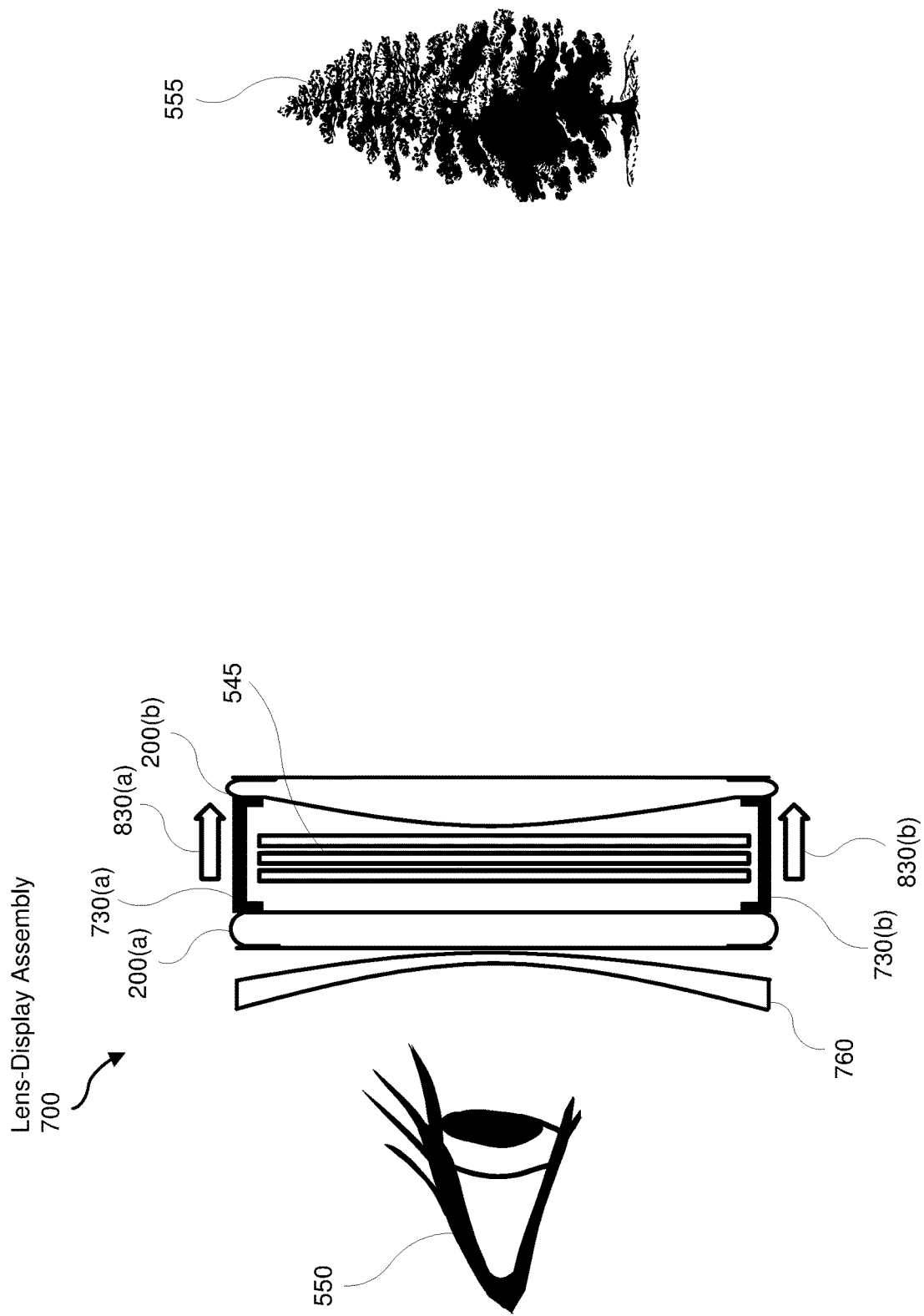
FIG. 8 is a side view of the additional lens-display assembly in another adjusted state.

FIGS. 7 and 8 illustrate a lens-display assembly 700. As shown in FIG. 7, lens-display assembly 700 may include adjustable lenses 200(a) and 200(b) connected by carriages 730(a) and 730(b). However, differing from lens-display assembly 500 shown in FIGS. 5 and 6, lens-display assembly 700 may be configured such that when one of adjustable lenses 200(a) and 200(b) is substantially flat, the other is not. For example, as shown in FIG. 7, carriages 740(a) and 740(b) may be moved toward the user's eye 550 and adjustable lens 200(a), such that adjustable lens 200(a) is plano-convex and adjustable lens 200(b) is flat. The difference in configurations between lens-display assembly 700 and lens-display assembly 500 may be achieved in any of a variety of ways. For example, carriages 730(a) and 730(b) of lens-display assembly 700 may be longer than carriages 530(a) and 530(b) of lens-display assembly 500. Additionally or alternatively, adjustable lenses 200(a) and 200(b) may be positioned more closely together in lens-display assembly 700 and further apart in lens-display assembly 500.

In addition to adjustable lenses 200(a) and 200(b), lens-display assembly 700 may include a lens 760 placed in front of adjustable lens 200(a). In some examples, lens 760 may be a fixed lens. In addition, in some examples, lens 760 may be a negative lens. For example, as shown in FIG. 7, lens 760 may be a negative meniscus lens.

In one example, the positive optical power of adjustable lens 200(a) may compensate for the negative optical power of lens 460, resulting in no apparent change to an image displayed on display 545 or to tree 555.

FIG. 8 shows lens-display assembly 700 in a different state. As shown in FIG. 8, carriages 730(a) and 730(b) may move away from the user's eye 550 and adjustable lens 200(a) and toward adjustable lens 200(b), applying forces 830(a) and 830(b). Accordingly, adjustable lens 200(a) may become flat and adjustable lens 200(b) may become plano-convex. In one example, lens-display assembly 700 as shown in FIG. 8 may cause an image displayed on display 545 to appear more distant in terms of accommodation of the user's eye 550.

Figure 9:
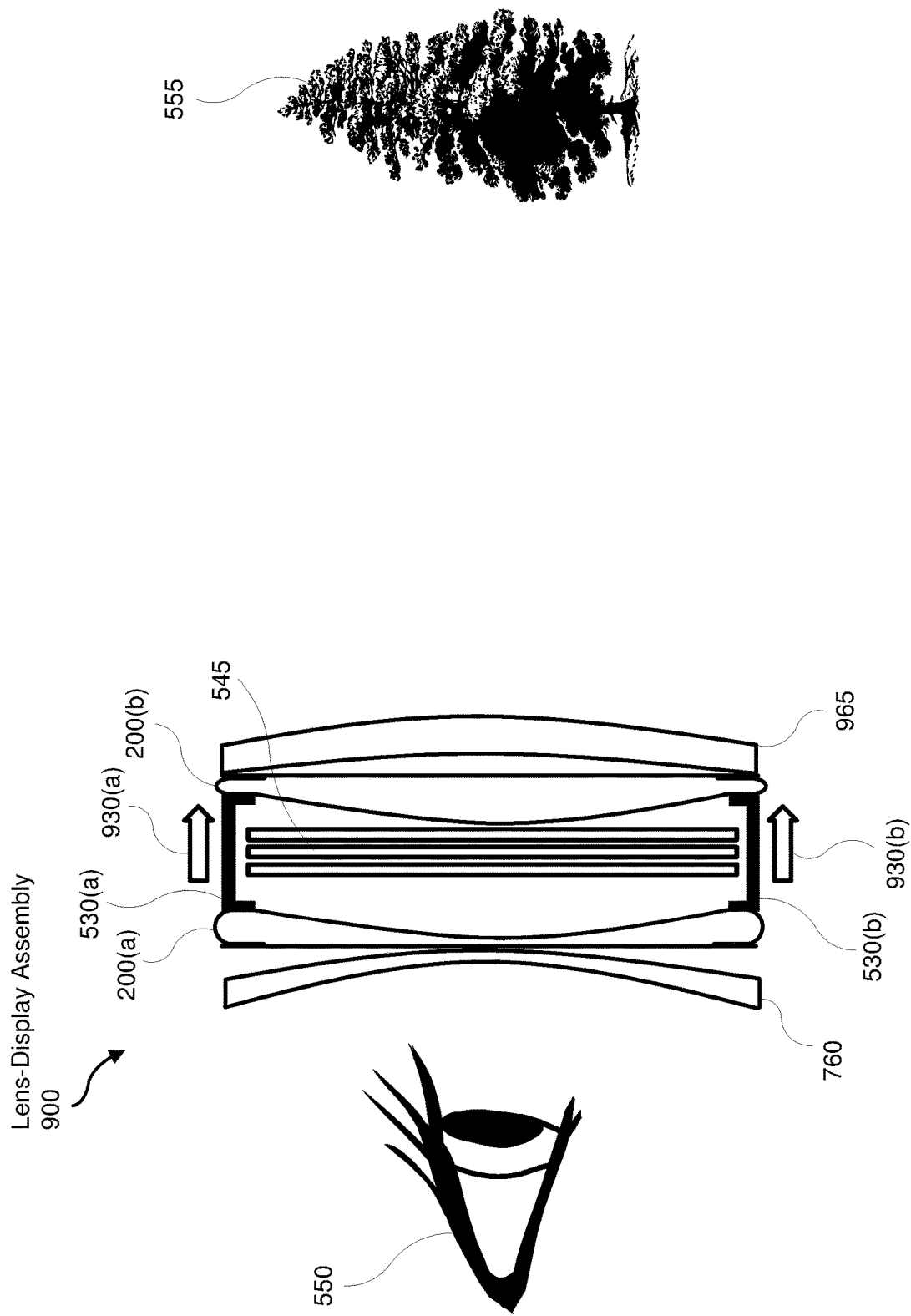
FIG. 9 is a side view of a further lens-display assembly in an adjusted state.
Figure 10:
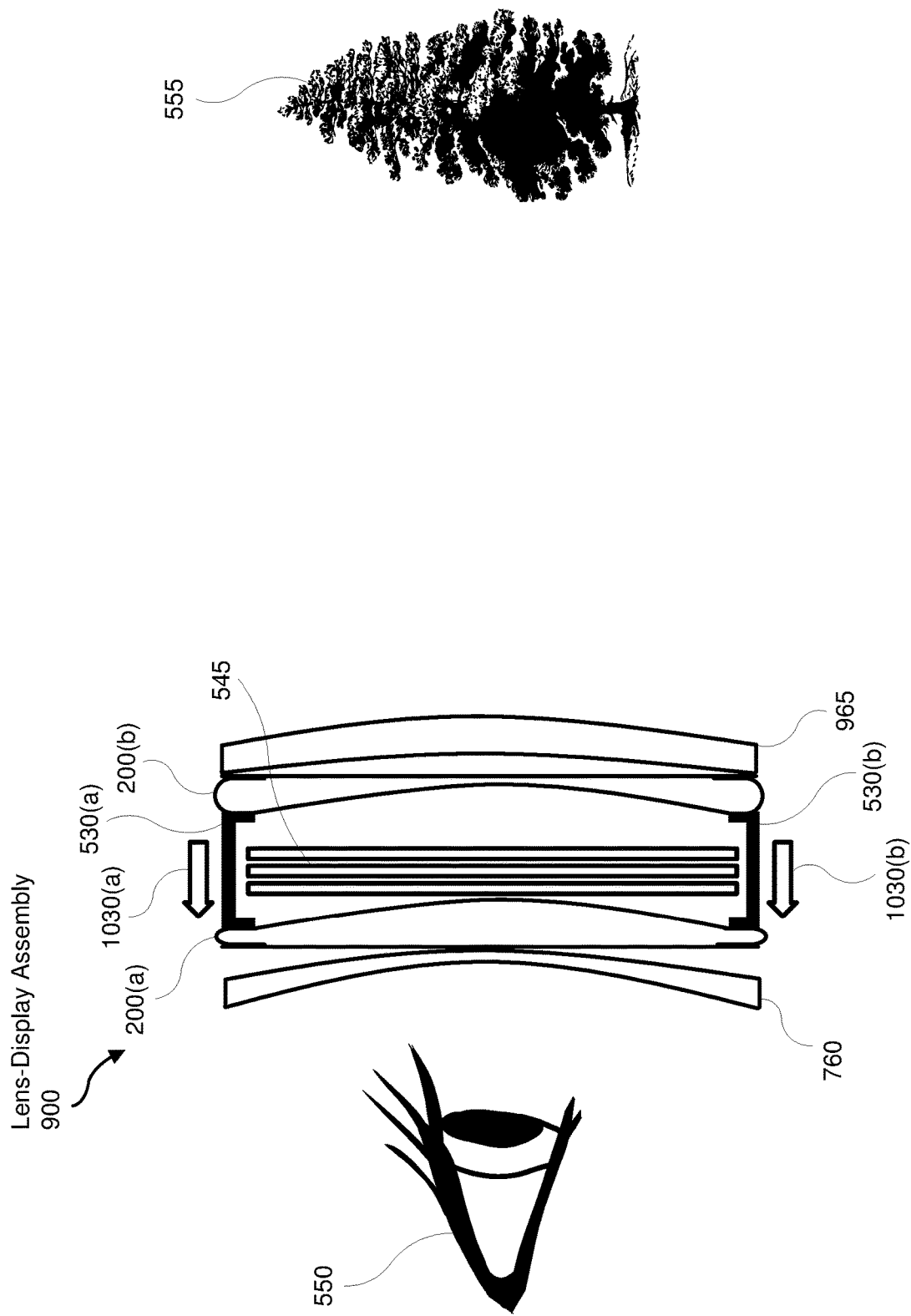
FIG. 10 is a side view of the further lens-display assembly in another adjusted state.

FIGS. 9 and 10 illustrate a lens-display assembly 900. As shown in FIG. 9, lens-display assembly 900 may include adjustable lenses 200(a) and 200(b) connected by carriages 530(a) and 530(b). In addition, lens-display assembly 900 may include lens 760 positioned before adjustable lens 200(a) and a lens 965 positioned after adjustable lens 200(b). In some examples, lens-display assembly 900 may resemble lens-display assembly 500 with the addition of lenses 760 and 965. In some examples, lens 965 may be a fixed lens. In addition, in some examples, lens 965 may be a positive lens. For example, as shown in FIG. 9, lens 965 may be a positive meniscus lens.

As shown in FIG. 9, carriages 530(a) and 530(b) may be moved away from the user's eye and adjustable lens 200(a) and toward adjustable lens 200(b). Accordingly, carriages 530(a) and 530(b) may apply forces 930(a) and 930(b), respectively, causing adjustable lens 200(a) to form a plano-concave lens and adjustable lens 200(b) to form a plano-convex lens.

In some examples, the inclusion of lenses 760 and 965 may improve the accommodation range of lens-display assembly 900. For example, when adjustable lens 200(a) is at maximum optical power in a plano-concave state, the combination of adjustable lens 200(a) and lens 860 may cause an image from display 545 to appear at an infinite image distance in terms of the user eye's 550 accommodation. However, the combination of lens 760, adjustable lens 200(a), adjustable lens 200(b), and lens 965 may have no significant optical power, causing the appearance of tree 555 to not be significantly affected by lens-display assembly 900.

FIG. 10 shows lens-display assembly 900 in a different state. As shown in FIG. 10, carriages 530(a) and 530(b) may move toward the user's eye 550 and adjustable lens 200(a) and away from adjustable lens 200(b). Accordingly, carriages 530(a) and 530(b) may apply forces 1030(a) and 1030(b), respectively, causing adjustable lens 200(a) to form a plano-convex lens and adjustable lens 200(b) to form a plano-concave lens.

In some examples, when lens-display assembly 900 is as shown in FIG. 10, the combination of lens 760 and adjustable lens 200(a) may have little or no significant power, causing an image displayed from display 545 to appear near the user's eye 550 (e.g., to appear, in terms of accommodation of the user's eye 550, at the actual distance of display 545 from the user's eye 550). In addition, the combination of lens 760, adjustable lens 200(a), adjustable lens 200(b), and lens 965 may have no significant optical power, causing the appearance of tree 555 to not be significantly affected by lens-display assembly 900.

As may be appreciated, although FIGS. 9 and 10 may show extreme distinct states of lens-display assembly 900, in some examples, intermediate positionings of carriages 530(a) and 530(b) may result in intermediate changes to the apparent accommodation distance of images displayed by display 545, allowing for a continuous range of possible apparent accommodation distances for virtual objects while maintaining the fidelity of the appearance of real-world objects.

Figure 11:
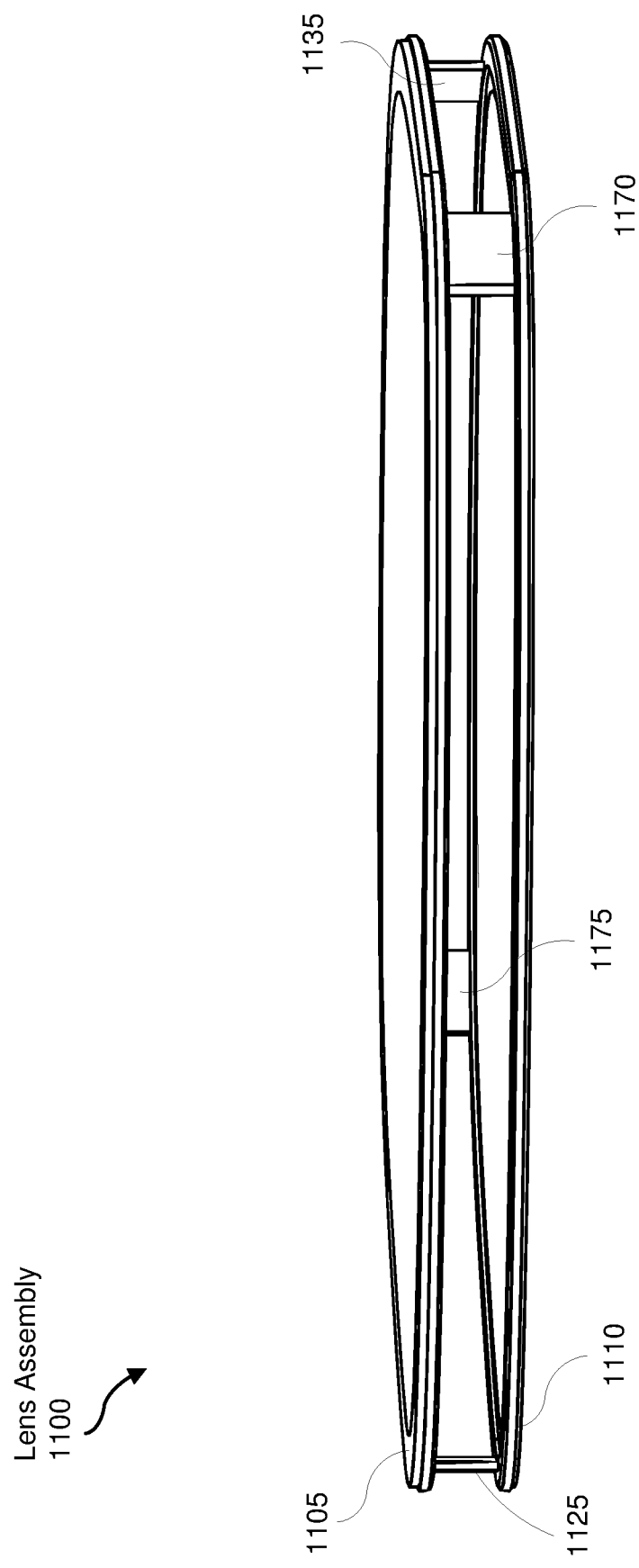
FIG. 11 is a perspective view of a lens assembly.

FIG. 11 illustrates a lens assembly 1100. As shown in FIG. 11, lens assembly 110 may include an adjustable lens 1105, an adjustable lens 1110, and carriages 1125, 1135, 1170, and 1175, connecting adjustable lenses 1105 and 1110 by their respective force distributors (not pictured). While FIG. 11 shows four carriages, a lens assembly may include one, two, three, four, or more carriages. In some examples, each carriage may be individually driven by an actuator. In some examples, combinations of carriages may be driven by a single actuator. For example, carriages 1125 and 1175 may be driven by one actuator while carriages 1135 and 1170 may be driven by another actuator. In another example, carriages 1125, 1135, 1170, and 1175 may all be driven by a single actuator. In some examples, carriages may be located at the regions of the adjustable lenses where the maximum deflection of the membrane is desired. In some examples, the force distributor connected to an adjustable lens may have a degree of flexural modulus such that the membrane forms a desired optical shape. For example, using the principles of finite element analysis, a set of force distributors may be positioned and/or designed such that deflection of the actuators would create a spherical lens shape from the membrane.

Figure 12:
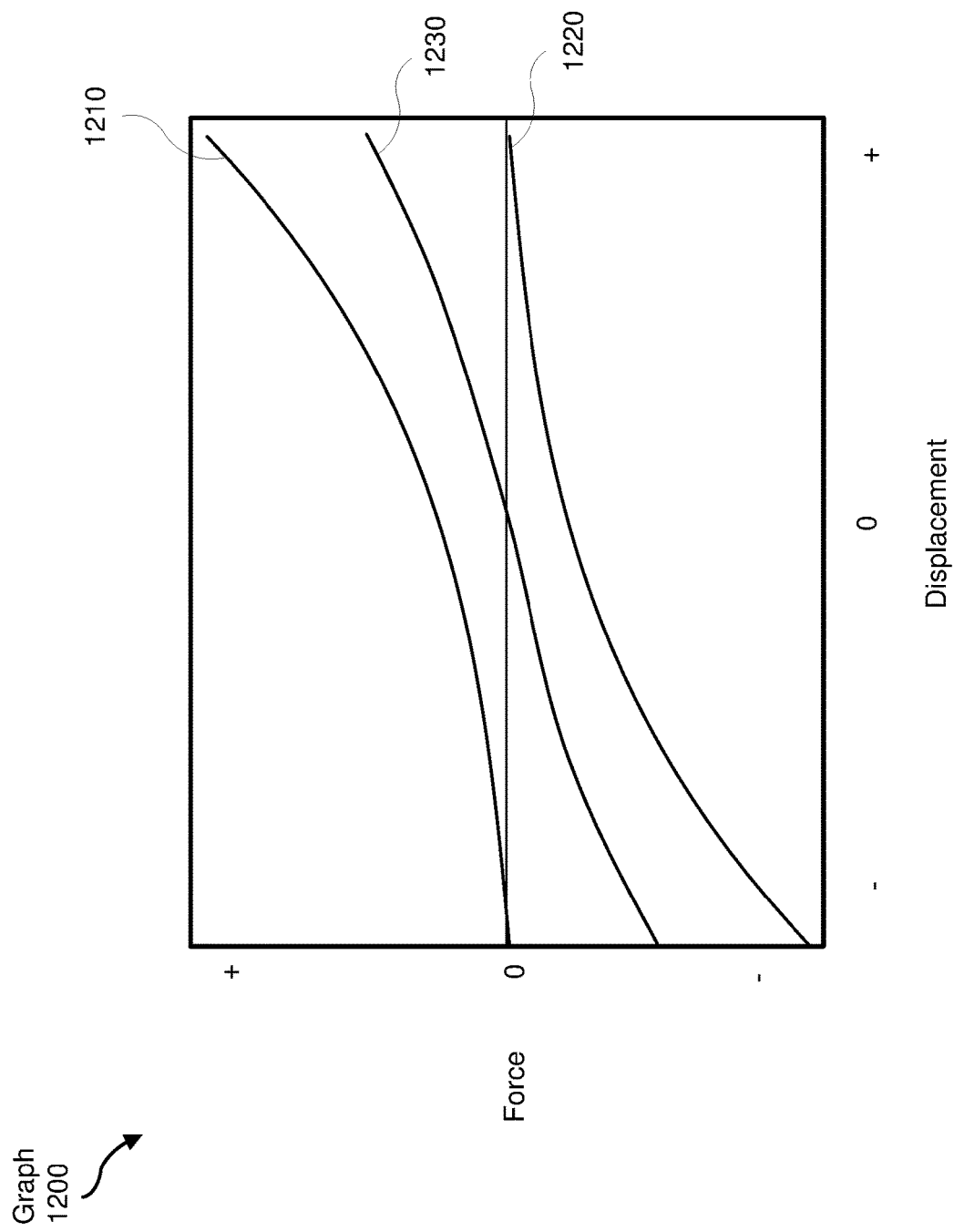
FIG. 12 is an illustration of force/displacement curves.

FIG. 12 illustrates a force/displacement graph 1200 that shows, by way of example, possible actuator forces for adjustable lens assemblies. For example, graph 1200 may show force/displacement relationships for lens-display assembly 700 as illustrated in FIGS. 7 and 8. For example, force curves 1210 and 1220 may show the actuator forces applied to achieve corresponding displacement where actuators are independently connected to each adjustable lens of lens-display assembly 700. Where each lens is driven independently, when an adjustable lens is flat, low actuator force may achieve an incremental displacement. When an adjustable lens nears its maximum curvature, a higher actuator force may achieve the same incremental displacement. However, by connecting the two adjustable lenses with a carriage, and driving the carriage with an actuator to adjust the lenses, a force curve 1230 may apply to the displacement of the carriage. Thus, by connecting the same actuators to the carriage, each actuator may achieve maximum displacement with a lower peak force.

In some examples, the design of one or more actuators described herein may further flatten the force/displacement curve and/or further reduce peak forces for achieving maximum displacement. For example, one or more of the actuators herein may be configured such that the actuator is in a high-energy state in a neutral position (i.e., representing a central position for the carriage between the adjustable lenses) and in a low-energy state when in an extreme position (i.e., representing an extreme position for the carriage toward one of the two adjustable lenses).

Figure 13:
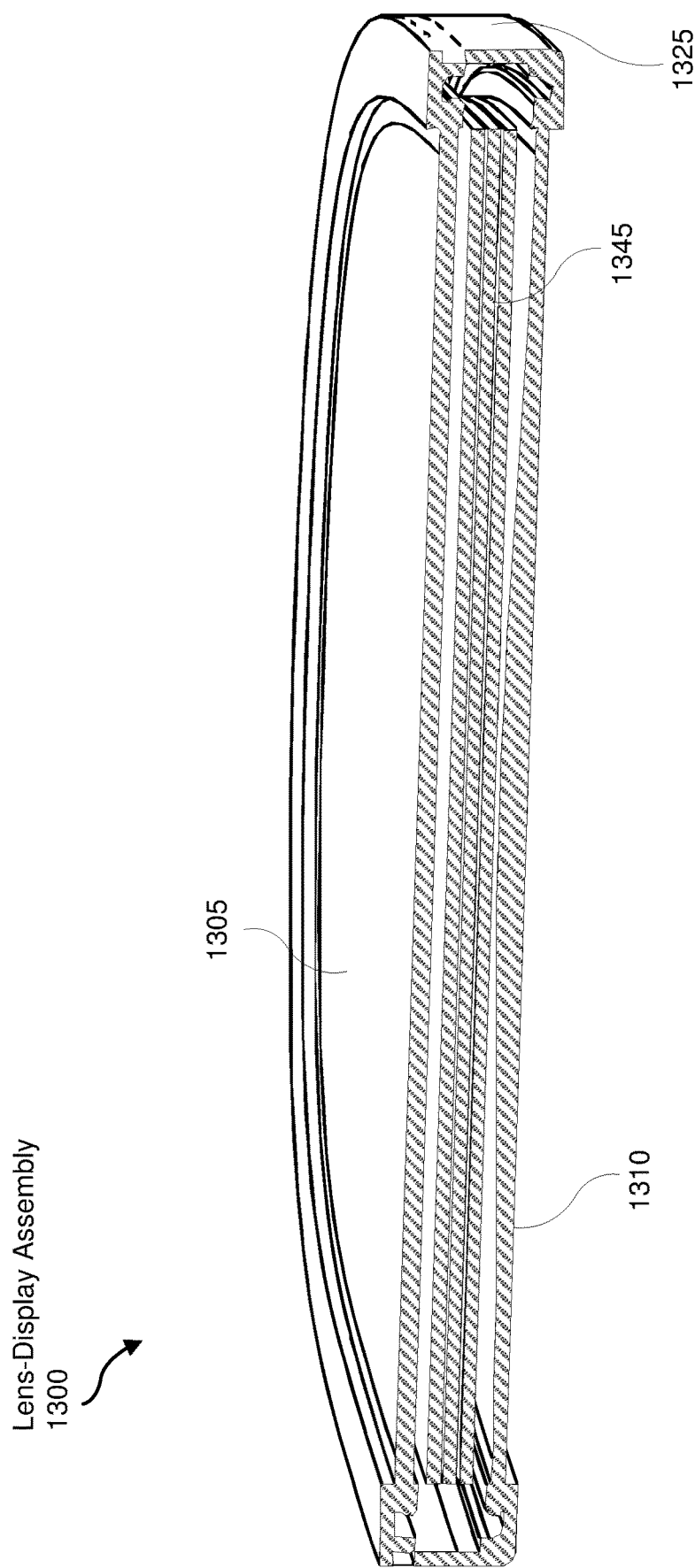
FIG. 13 is a cross-sectional view of a lens-display apparatus.

FIG. 13 illustrates a lens-display assembly 1300. As shown in FIG. 13, lens-display assembly 1300 may include an adjustable lens 1305, an adjustable lens 1310, a display 1345 positioned between adjustable lenses 1305 and 1310, and a lens assembly housing 1325. In some examples, the volume between lens assembly housing 1325 and display 1345 may provide space for actuators. According to some examples, the combination of adjustable lenses 1305 and 1310 may modify the apparent accommodation distance of images created by display 1345 without changing the appearance of distant real-world objects as perceived by a user's eye.

Figure 14:
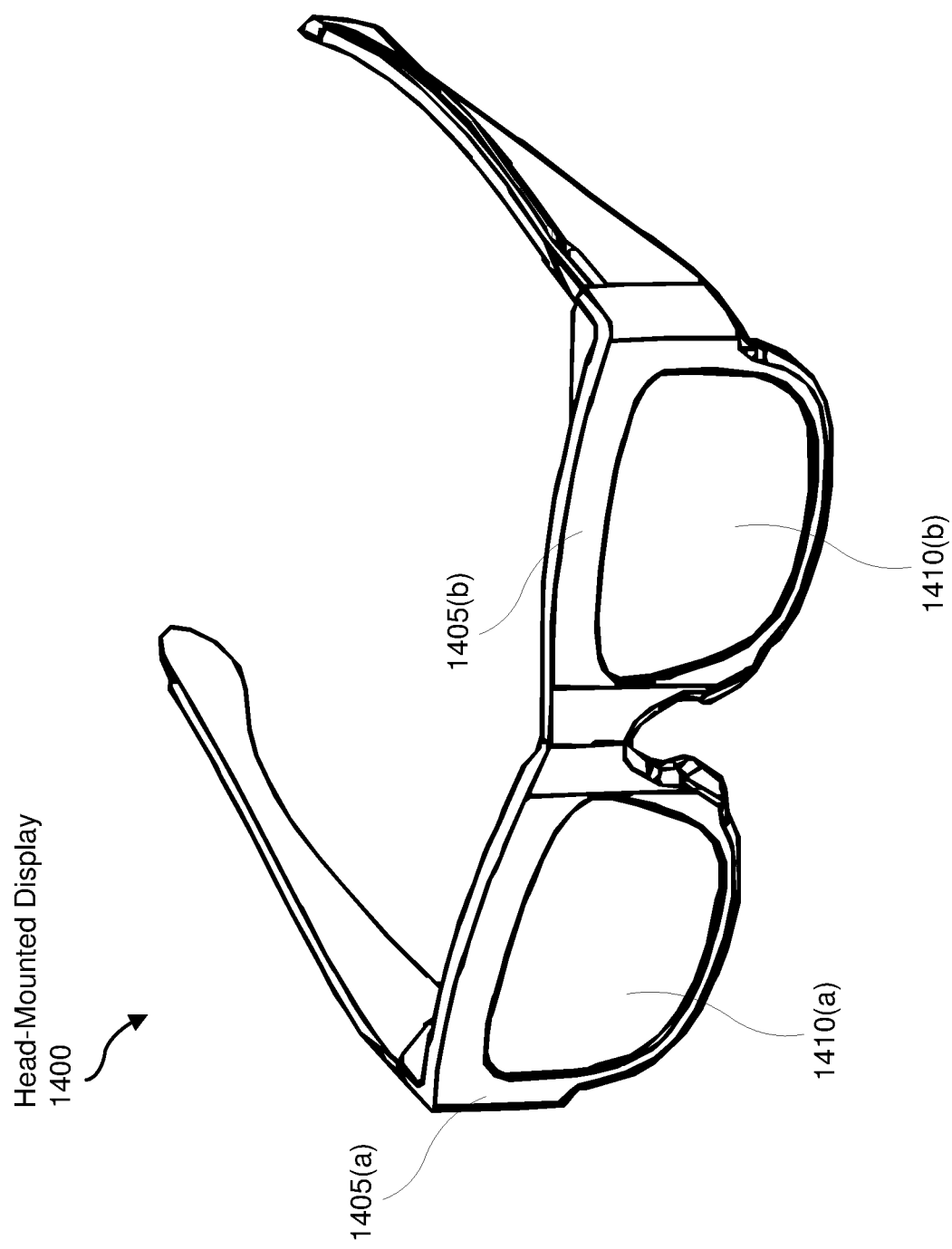
FIG. 14 is a perspective view of a head-mounted display.

FIG. 14 illustrates a head-mounted display 1400. As shown in FIG. 14, head-mounted display 1400 may take the form factor of wearable glasses. A bezel 1405(a) may hold a lens-display assembly 1410(a) (e.g., corresponding to lens-display assembly 500, 700, or 900) and a bezel 1405(b) may hold a lens-display assembly 1410(b) (corresponding to lens-display assembly 500, 700, or 900).

Figure 15:
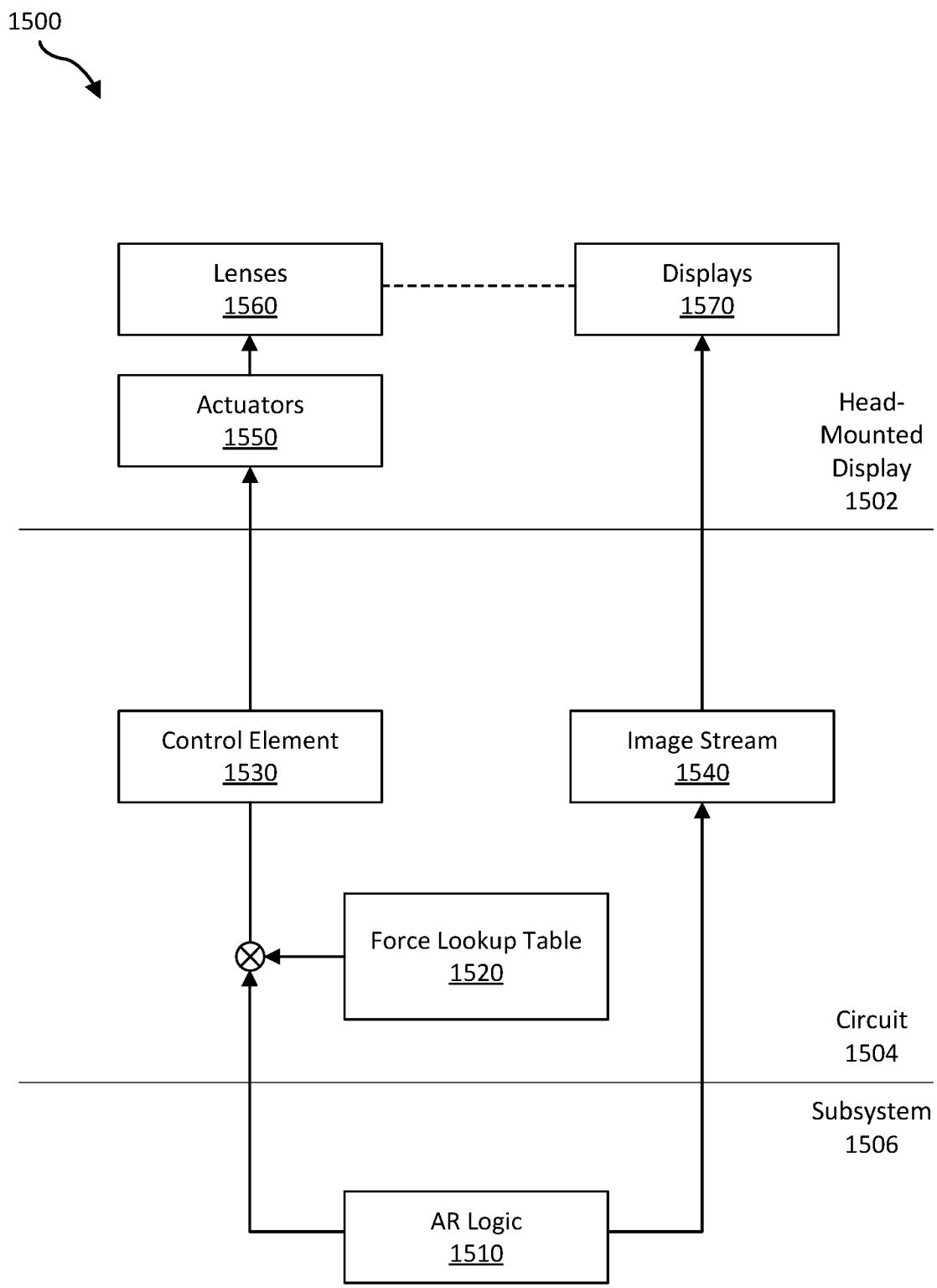
FIG. 15 is a block diagram of an augmented reality system.

FIG. 15 illustrates a system 1500 that adjusts apparent accommodation distances for virtual images in augmented-reality displays. As shown in FIG. 15, system 1500 may include a head-mounted display 1502, a circuit 1504, and a subsystem 1506. Head-mounted display 1502 and circuit 1504 may be communicatively coupled. Likewise, circuit 1504 and subsystem 1506 may be communicatively coupled. Subsystem 1510 may process augmented reality logic 1510 that determines what virtual objects are to be displayed and real-world positions onto which the virtual objects are to be projected. Accordingly, subsystem 1506 may generate an image stream 1540 that is displayed by displays 1570 in such a way that alignment of right- and left-side images displayed in displays 1570 results in ocular vergence toward a desired real-world position. A control element 1520 may use the same positioning information determined by augmented reality logic 1510, in combination with a force lookup table 1520, to determine an amount of force to be applied by actuators 1550 to lenses 1560. Actuators 1550 may, responsive to control element 1530, apply appropriate forces to lenses 1560 to adjust the apparent accommodation distance of virtual images displayed in displays 1570 to match the apparent vergence distance of the virtual images, thereby reducing or eliminating accommodation-vergence conflict.

In some examples, system 1500 may display multiple virtual objects at once. Accordingly, system 1500 may determine which virtual object a user is viewing (or is likely to be viewing) to determine for which virtual object to correct the apparent accommodation distance. For example, system 1500 may include an eye tracking device that provides information to control element 1530 such that control element 1530 selects, from information provided by augmented reality logic 1510, the position of the relevant virtual object. Additionally or alternatively, augmented reality logic 1510 may provide information about which virtual object is the most important and/or most likely to draw the attention of the user (e.g., based on proximity, on movement, on recency, and/or on a semantic importance metric attached to the virtual object according to augmented reality logic 1510). In some examples, system 1500 may identify multiple potentially important virtual objects, and select an apparent accommodation distance that approximates the virtual distance of a group of the potentially important virtual objects.

Circuit 1504 may represent any suitable circuit for implementing accommodation adjustment. In some examples, circuit 1504 may represent a system on a chip (SOC). As illustrated in FIG. 15, in some examples control element 1530 and/or force lookup table 1520 may form parts of circuit 1504. Additionally or alternatively, force lookup table 1520 and/or control element 1530 may form parts of subsystem 1506. In some examples, one or more portions of circuit 1504 may include one or more hardware modules. Additionally or alternatively, one or more portions of circuit 1504 may include one or more software modules that perform one or more of the tasks described herein when stored in the memory of a computing device and executing by a hardware processor of a computing device.

Subsystem 1506 may represent any suitable system for providing display data, augmented reality data, and/or augmented reality logic for a head-mounted display. In some examples, subsystem 1506 may represent a graphics processing unit (GPU) and/or any other type of hardware accelerator designed to optimize graphics processing. Additionally or alternatively, subsystem 1506 may represent a computing device for an augmented reality system.

Figure 16:
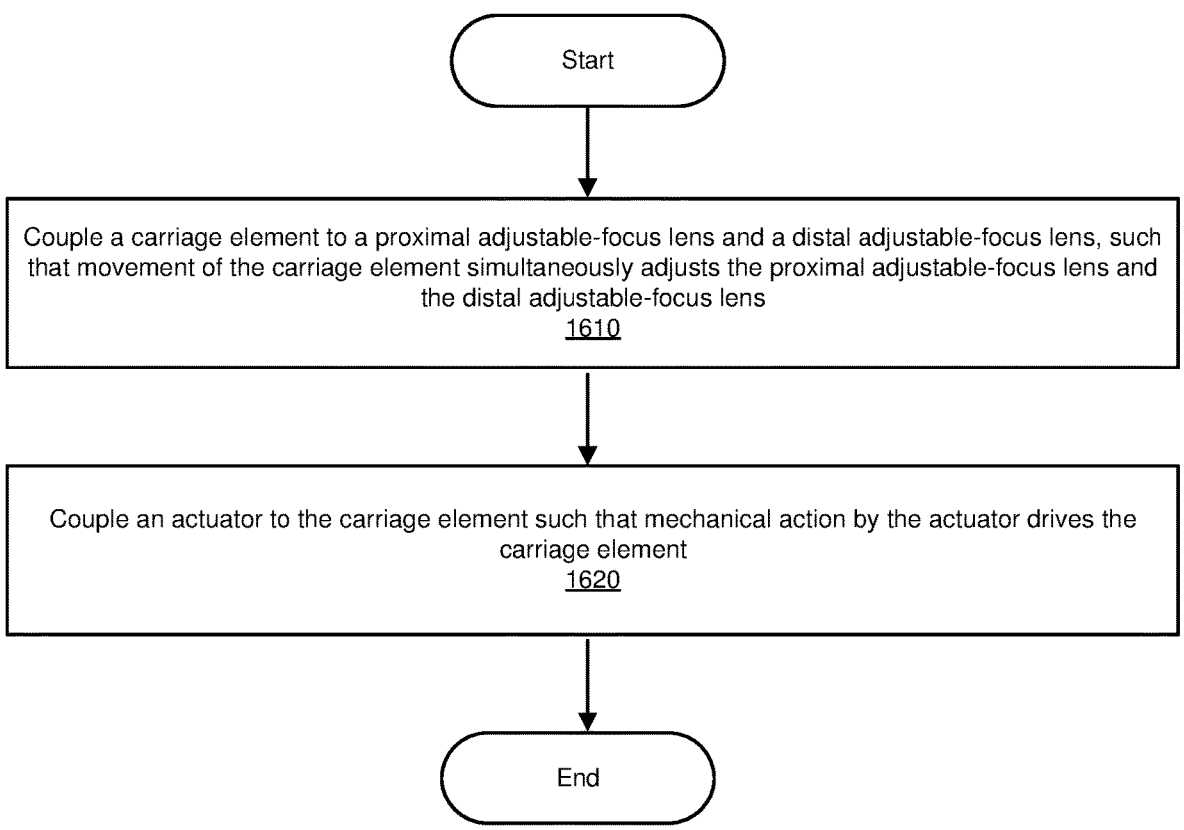
FIG. 16 is a flow diagram of a method for assembling a lens-display apparatus.

FIG. 16 shows a flow diagram of an example method 1400 for manufacturing, assembling, and/or configuring one or more of the systems and apparatuses described herein. As shown in FIG. 16, at step 1610 a carriage element may be coupled to a proximal adjustable-focus lens and a distal adjustable-focus lens, such that movement of the carriage element simultaneously adjusts the proximal adjustable-focus lens and the distal adjustable-focus lens. For example, as shown in FIG. 5, carriage 530(*a*) may be coupled to adjustable lens 200(*a*) and adjustable lens 200(*b*), such that movement of carriage 530(*a*) simultaneously adjusts adjustable lens 200(*a*) and adjustable lens 200(*b*). At step 1620, an actuator may be coupled to the carriage element such that mechanical action by the actuator drives the carriage element. For example, an actuator may be coupled to carriage 530(*a*) such that mechanical action by the actuator drives carriage 530(*a*).

As explained above, an optical system may manage accommodation of a virtual display without substantially altering the appearance of a real-world image. The optical system may include a first and a second liquid lens, where there is a first force distributor on the first liquid lens and a second force distributor on the second liquid lens. In addition, mechanical connections can apply pressure to the liquid within the liquid lenses. The first and second force distributors may be mechanically connected with a carriage, and the carriage may be driven by an electromechanical actuator. In some examples, a lens membrane shape may transition between being approximately flat to convex. In some examples, a lens membrane shape may transition between a concave and a convex shape. In some examples, when the membrane of one lens is convex, the membrane of the other lens may be concave.

In some examples, by simultaneously adjusting the lenses, the adjustment mechanism may modify the optical power provided for images originating between the pair of adjustable lenses without modifying the optical power provided for images originating beyond the pair of adjustable lenses in the same way. For example, the adjustment mechanism may modify the optical power provided for an image originating between the pair of adjustable lenses (e.g., from an augmented reality display) without modifying the optical power provided for an image originating beyond the pair of adjustable lenses (e.g., from a real-world object). In some examples, this may allow apparatuses and systems described herein to reduce, minimize, or eliminate accommodation-vergence conflict caused by augmented reality displays by modifying the apparent accommodation distance of images while minimizing any distortion to real-world images. Furthermore, in some examples, by using a single actuator to drive a carriage element connecting the lenses, these apparatus and systems may reduce the amount of actuating force applied to deform the lenses. In addition, the use of a single adjustment mechanism may reduce the form factor, the cost of manufacture, and/or the potential points of failure of an adjustable lens assembly. As discussed in greater detail below, the various embodiments disclosed herein, whether used alone or in combination, may help optimize the immersiveness, enjoyability, and/or utility of an augmented-reality experience.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a proximal adjustable-focus lens;
a distal adjustable-focus lens; and
an actuator coupled to a carriage element, wherein the carriage element is coupled to both the proximal adjustable-focus lens and the distal adjustable-focus lens, such that mechanical action by the actuator drives the carriage element and simultaneously adjusts the proximal adjustable-focus lens and the distal adjustable-focus lens.

2. The apparatus of claim 1 wherein:
the proximal adjustable-focus lens comprises a proximal liquid lens; and
the distal adjustable-focus lens comprises a distal liquid lens.

3. The apparatus of claim 2, wherein:
the proximal liquid lens further comprises a first force distributor coupled to a membrane of the proximal liquid lens, wherein the first force distributor distributes force applied to a surface area of the first force distributor via the carriage element to a surface area of the membrane of the proximal liquid lens, thereby modifying a shape of the proximal liquid lens; and
the distal liquid lens further comprises a second force distributor coupled to a membrane of the distal liquid lens, wherein the second force distributor distributes force applied to a surface area of the second force distributor via the carriage element to a surface area of the membrane of the distal liquid lens, thereby modifying a shape of the distal liquid lens.

4. The apparatus of claim 2, wherein:
movement of the carriage element toward the proximal liquid lens moves the carriage element away from the distal liquid lens, thereby causing:
a change in force applied to the proximal liquid lens representing a change in a direction toward the proximal liquid lens; and
a change in force applied to the distal liquid lens representing a change in a direction away from the distal liquid lens; and
movement of the carriage element toward the distal liquid lens moves the carriage element away from the distal liquid lens, thereby causing:
a change in force applied to the distal liquid lens representing a change in a direction toward the distal liquid lens; and
a change in force applied to the proximal liquid lens representing a change in a direction away from the proximal liquid lens.

5. The apparatus of claim 2, wherein:
movement of the carriage element toward the proximal liquid lens moves the carriage element away from the distal liquid lens, resulting in an increase in a pushing force applied via the carriage element onto the proximal liquid lens and a decrease in a pushing force applied via the carriage element onto the distal liquid lens; and
movement of the carriage element toward the distal liquid lens moves the carriage element away from the proximal liquid lens, resulting in an increase in a pushing force applied via the carriage element onto the distal liquid lens and a decrease in a pushing force applied via the carriage element onto the proximal liquid lens.

6. The apparatus of claim 2, wherein:
movement of the carriage element toward the proximal liquid lens moves the carriage element away from the distal liquid lens, resulting in:
a decrease in a pulling force applied via the carriage element on the proximal liquid lens and a decrease in a pushing force applied via the carriage element toward the distal liquid lens when the carriage element is at greater than a threshold distance from the proximal liquid lens; and
an increase in a pushing force applied via the carriage element onto the proximal liquid lens and an increase in a pulling force applied via the carriage element on the distal liquid lens when the carriage element is at less than the threshold distance from the proximal liquid lens; and
movement of the carriage element toward the distal liquid lens moves the carriage element away from the proximal liquid lens, resulting in:
a decrease in a pulling force applied via the carriage element on the distal liquid lens and a decrease in a pushing force applied via the carriage element toward the proximal liquid lens when the carriage element is at less than the threshold distance from the proximal liquid lens; and
an increase in a pushing force applied via the carriage element onto the distal liquid lens and an increasing in a pulling force applied via the carriage element on the proximal liquid lens when the carriage element is at greater than the threshold distance from the proximal liquid lens.

7. The apparatus of claim 1, wherein a combination of the proximal adjustable-focus lens and the distal adjustable-focus lens maintains a substantially no optical power as the proximal adjustable-focus lens and the distal adjustable-focus lens adjust.

8. The apparatus of claim 1, wherein a combination of the proximal adjustable-focus lens and the distal adjustable-focus lens maintains substantially constant optical power as the proximal adjustable-focus lens and the distal adjustable-focus lens adjust.

9. The apparatus of claim 8, wherein:
as the proximal adjustable-focus lens adjusts to increase in optical power, the distal adjustable-focus lens adjusts to decrease in optical power; and
as the proximal adjustable-focus lens adjusts to decrease in optical power, the distal adjustable-focus lens adjusts to increase in optical power.

10. The apparatus of claim 9, wherein:
the proximal adjustable-focus lens adjusts to increase in optical power by at least one of:
  adjusting to increase in convexity; or
  adjusting to decrease in concavity;
the distal adjustable-focus lens adjusts to increase in optical power by at least one of:
  adjusting to increase in convexity; or
  adjusting to decrease in concavity;
the proximal adjustable-focus lens adjusts to decrease in optical power by at least one of:
  adjusting to increase in concavity; or
  adjusting to decrease in convexity; and
the distal adjustable-focus lens adjusts to decrease in optical power by at least one of:
  adjusting to increase in concavity; or
  adjusting to decrease in convexity.

11. The apparatus of claim 10, further comprising a proximal negative lens that shares an optical axis with the proximal adjustable-focus lens and the distal adjustable-focus lens and that is adjacent to the proximal adjustable-focus lens.

12. The apparatus of claim 11, wherein a combination of the proximal negative lens, the proximal adjustable-focus lens, and the distal adjustable-focus lens maintains substantially no optical power as the proximal adjustable-focus lens and the distal adjustable-focus lens adjust.

13. The apparatus of claim 10, further comprising:
a proximal negative lens that shares an optical axis with the proximal adjustable-focus lens and the distal adjustable-focus lens and that is adjacent to the proximal adjustable-focus lens; and
  a distal positive lens that shares the optical axis and that is adjacent to the distal adjustable-focus lens.

14. The apparatus of claim 13, wherein a combination of the proximal negative lens, the proximal adjustable-focus lens, the distal adjustable-focus lens, and the distal positive lens maintains substantially no optical power as the proximal adjustable-focus lens and the distal adjustable-focus lens adjust.

15. The apparatus of claim 1, further comprising:
a see-through display situated between the proximal adjustable-focus lens and the distal adjustable-focus lens, such that, when the proximal adjustable-focus lens is held up to a user's face, the user views the see-through display through the proximal adjustable-focus lens and views past the see-through display through the proximal adjustable-focus lens and the distal adjustable-focus lens;

wherein:
adjusting the proximal adjustable-focus lens alters an apparent accommodation distance of a virtual image displayed on the see-through display; and
the distal adjustable-focus lens adjusts as the proximal adjustable-focus lens adjusts such that an appearance of a real-world image viewable past the see-through display is not substantially altered when the proximal adjustable-focus lens adjusts.

16. A system comprising:
a head-mounted display comprising a pair of lens-display assemblies, each lens-display assembly comprising:
  a proximal adjustable-focus lens and a distal adjustable-focus lens arranged in tandem along an optical axis;
  an actuator coupled to a carriage element, wherein the carriage element is coupled to both the proximal adjustable-focus lens and the distal adjustable-focus lens, such that mechanical action by the actuator drives the carriage element and simultaneously adjusts the proximal adjustable-focus lens and the distal adjustable-focus lens; and
  a see-through display situated between the proximal adjustable-focus lens and the distal adjustable-focus lens, such that, when the lens-display assembly is held up to a user's face, the user views the see-through display through the proximal adjustable-focus lens and views past the see-through display through the proximal adjustable-focus lens and the distal adjustable-focus lens;
wherein:
  adjusting the proximal adjustable-focus lens alters an apparent accommodation distance of a virtual image displayed on the see-through display; and
  the distal adjustable-focus lens adjusts as the proximal adjustable-focus lens adjusts such that an appearance of a real-world image viewable past the see-through display is not substantially altered when the proximal adjustable-focus lens adjusts.

17. The system of claim 16, wherein an augmented reality system displays the virtual image in the respective see-through displays of each of the pair of lens-display assemblies such that the virtual image appears to be situated in the user's environment according to an apparent focal point determined by a positioning of the virtual image in the respective see-through displays of each of the pair of lens-display assemblies.

18. The system of claim 17, further comprising a control element that: receives virtual positioning information from the augmented reality system that indicates a virtual distance of the virtual image from the user, wherein the control element, based at least in part on the virtual positioning information, directs the positioning of the virtual image in the respective see-through displays of each of the pair of lens-display assemblies; and
adjusts, for each lens-display assembly in the pair of lens-display assemblies, the proximal adjustable-focus lens such that an apparent accommodation distance of the virtual image substantially matches an apparent vergence distance of the virtual image.

19. A method comprising:
coupling a carriage element to a proximal adjustable-focus lens and a distal adjustable-focus lens, such that movement of the carriage element simultaneously adjusts the proximal adjustable-focus lens and the distal adjustable-focus lens; and coupling an actuator to the carriage element such that mechanical action by the actuator drives the carriage element.

\* \* \* \* \*